United States Patent [19]

Tatsumi

[11] 4,290,415
[45] Sep. 22, 1981

[54] BUILDING FOR COLD DISTRICTS

[76] Inventor: Tadao Tatsumi, No. 7, Higashi 6-jo 6-chome, Asahikawa-shi, Hokkaido, Japan

[21] Appl. No.: 98,745

[22] Filed: Nov. 30, 1979

[30] Foreign Application Priority Data

Mar. 17, 1979 [JP] Japan .............................. 54-34455[U]
May 14, 1979 [JP] Japan .................................. 54-59480
Aug. 14, 1979 [JP] Japan .................................. 54-103811

[51] Int. Cl.³ ................................................. F24J 3/02
[52] U.S. Cl. .................................... 126/429; 126/431; 126/435; 126/438; 126/450
[58] Field of Search ............................... 126/428–432, 126/435, 438, 450, 419, 427

[56] References Cited

U.S. PATENT DOCUMENTS

| | | | |
|---|---|---|---|
| 2,559,871 | 7/1951 | Gay | 126/429 |
| 2,907,318 | 10/1959 | Awot | 126/438 |
| 3,832,992 | 9/1974 | Trombe et al. | 126/429 |
| 3,902,474 | 9/1975 | Pyle | 126/429 |
| 3,994,276 | 11/1976 | Pulver | 126/429 |
| 4,051,999 | 10/1977 | Granger et al. | 126/431 |

Primary Examiner—James C. Yeung
Attorney, Agent, or Firm—Oblon, Fisher, Spivak, McClelland & Maier

[57] ABSTRACT

A building for cold districts, the building having a semi-basement and a roof including a room heater unit provided within the semi-basement, heat insulation materials provided on the outer side walls and bottom of the building and also a bottom portion of a narrow space under the roof of the building for heat insulating the interior of the building from external atmosphere, passage members each provided under a floor of each room of the building and communicating with the semi-basement such that warm air produced from the room heater unit is supplied through each of the passage members and to each room through the floor thereof and a solar heat absorption system provided on a sunny side outer wall of the building, the warm air supplied to each of the rooms and/or air within each room being introduced into the solar heat adsorption system, heated therein by use of solar heat and returned to each of the rooms for heating the rooms.

10 Claims, 6 Drawing Figures

BUILDING FOR COLD DISTRICTS

BACKGROUND OF THE INVENTION

1. Field of the Invention

The present invention is directed to the combination of structural elements utilized in a building for cold districts.

2. Description of the Prior Art

Hitherto, room heating of houses and other buildings has been practiced by installing a room heater or the like for each room or installing a room heating system for collectively heating rooms. Hot water supply systems are similarly installed in rooms where they are required, and it has also been practiced to lead water heated by utilizing solar heat to the water supply system for supplementing the supply of water.

Particularly in cold districts, the hot water supply duct led from the water supply system is likely to be broken due to freezing, and, for preventing this, it is covered with heat insulation material. In this case, the water temperature does not rise soon and the rate of output of hot water is very low so that it is difficult to supply a great quantity of hot water in a short period of time. Further, in a snowy area of a cold district, snow which has drifted on the roof freezes to form icicles hanging from the eves and such is also likely to present a danger of spontaneously falling in large masses. When a great quantity of snow is accumulated, therefore, it is necessary to drop snow from the roof and clear it away. In addition, if the dropped snow is not removed but is accumulated on snow drifted on the area surrounding the building, the resultant mass of snow not only obstructs traffic but is also likely to cause damage to the building and sometimes present a hazard to human life. The removal of accumulated snow requires considerable labor and expense which is very uneconomical.

SUMMARY OF THE INVENTION

This invention has been developed in the light of the above features of the prior art, and its primary object is to provide a building for cold districts, the inside of which is perfectly heat insulated from its outside to increase its heat insulation property, and which also incorporates a combination of a hot air circulation system using a small room heater and a solar heat absorption system to permit effective room heating to be obtained.

A second object of the invention is to provide the aforesaid building for cold districts with a hot water supply system, with which hot water is obtained from heat stored in the solar heat absorption system and is supplied to various units installed in rooms through respective water supply ducts, and which is efficient and free from freezing.

A third object of the invention is to provide the aforesaid building for cold districts, which is provided with a snow melting system for melting snow accumulated on its roof by making use of the heat of warm air produced from the room heater and also heat obtained from the solar heat absorption system, so that it is free from spontaneous falling of snow accumulated on its roof.

The building structure according to the invention may be applied not only to residential buildings but also to buildings with various other purposes through appropriate design and construction. Of the room heating, water supply and snow melting systems mentioned above, either the room heating system alone may be independently designed and provided, or the water supply system and/or snow melting system may, if necessary, be appropriately combined with the room heating system in design and construction.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
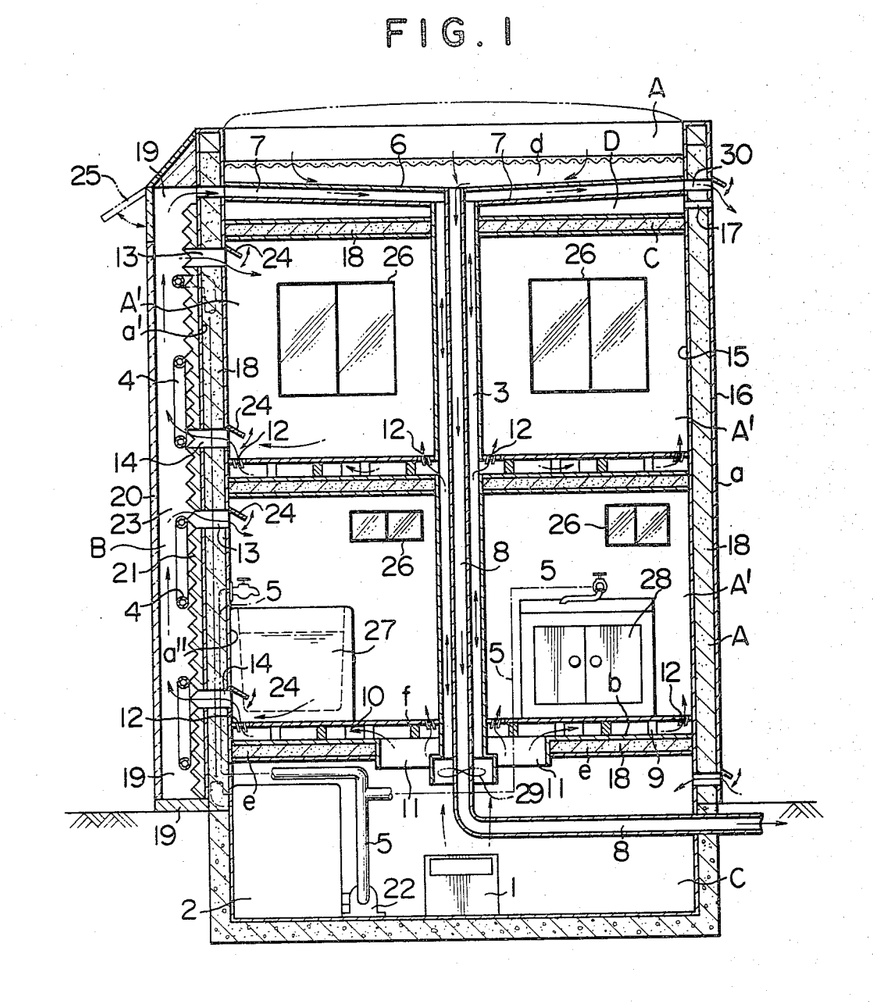
FIG. 1 is a side view, partly in section, showing a building for cold districts according to the invention.
Figure 2:
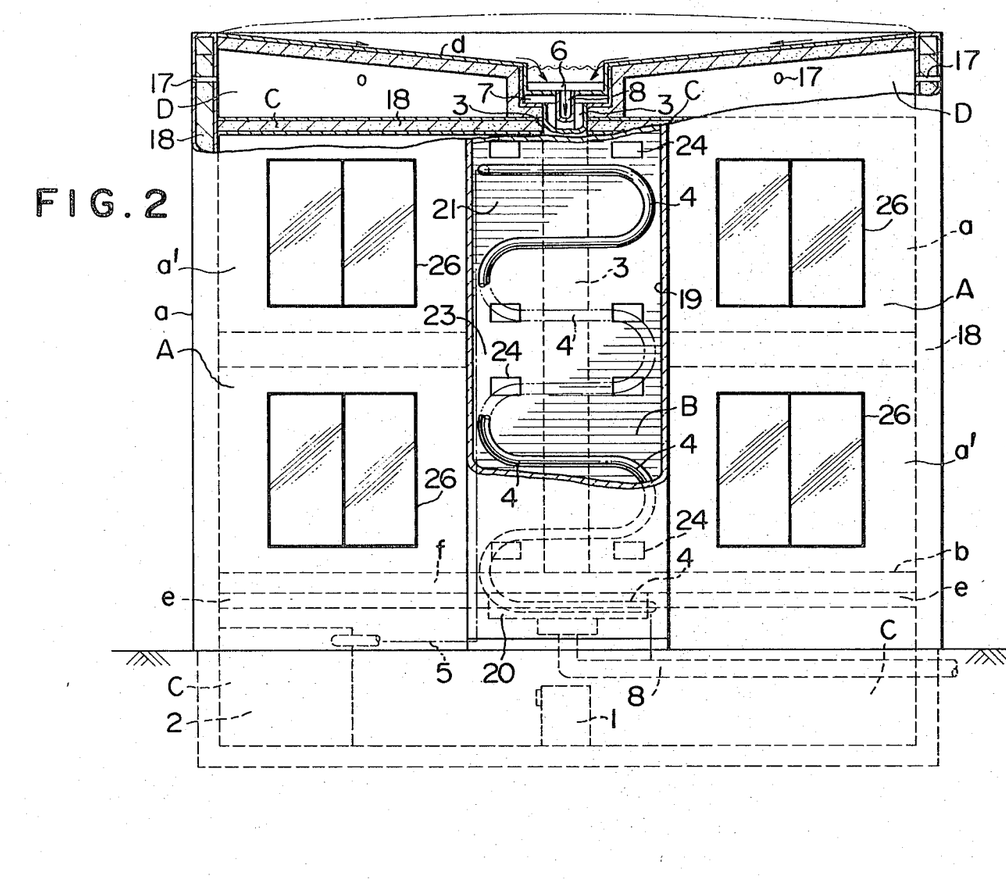
FIG. 2 is an elevational view, partly broken away, showing the same building.
Figure 3:
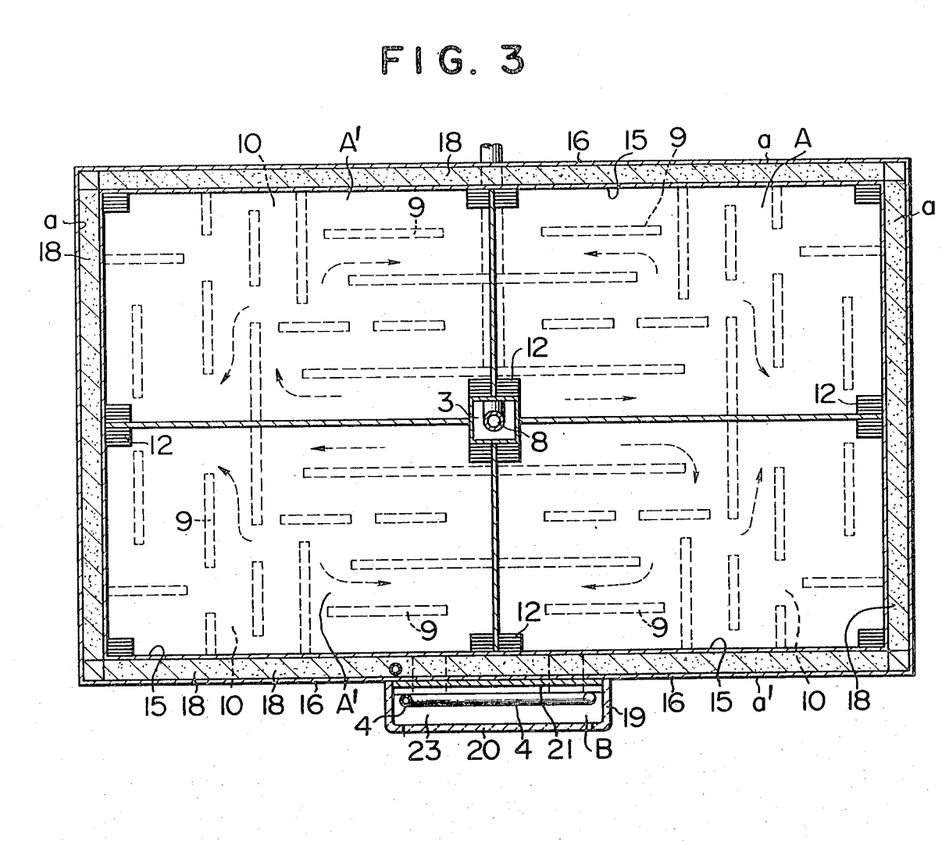
FIG. 3 is a plan sectional view of the same building.

Referring now to FIGS. 1 to 3, designated at A is a building, and at C is a semi-basement immediately therebeneath. In the semi-basement C, a small room heater 1 requiring little fuel cost and a water storage tank 2 capable of supplying water without the possibility of freezing of water are provided. A drain duct 8 extends from the roof d through the building and semi-basement into the ground for draining water resulting from melting of snow into the ground without causing its freezing. The ceiling e of the semi-basement C is provided with an air supply opening or port 11 for supplying heated air into the interior of the building A.

Between the ceiling e and a floor b of the building A a space f is provided to permit air heated by the small air heater 1 to be supplied to the interior of the building A, guide members 9 are provided in the space f to form a labyrinth-like warm air guide path 10, which communicates at one end with the warm air supply port 11 formed in the ceiling e of the semi-basement C and at the other end with ventilating ports 12 formed in the floor b of a building A so as to supply the warm air from the small room heater 1 provided in the semi-basement C uniformly to the interior A' of the building. In the interior A' of the building, a circulation path 3 for circulating warm air is vertically extended. The drain duct 8 extends through the circulation path 3, and a suction fan 29 for circulating warm air is provided in the path 3.

The sunny side a' of the building A is provided with a solar heat absorption system B communicating with upper and lower outlet and inlet ports 13 and 14. Warm air from the small room heater 1 is directly led to the circulation path 3 and is also supplied through the warm air supply port 11, warm air guide path 10 and ventilating ports 12 to the interior A' of the building, and together with warm air led through the inlet ports 14 and heat collection paths 23 in the solar heat absorption system B and, blown out from the outlet ports 13, warm air at a high temperature is supplied to the interior A' of the building for heating the building interior A'. Moreover, air in the building interior A' is circulated for cleaning through the upper and lower outlet and inlet ports 13 and 14 of the solar heat absorption system B and the suction fan 29 provided in the circulation path 3.

The outer wall a of the building A comprises inner and outer members 15 and 16 and a heat insulation material 18 interposed therebetween, and its portion corresponding to a narrow space D under the roof d of the building A is provided with a communication hole 17 to prevent a temperature difference between the space D and external air from resulting to prevent melting of snow directly over the roof d for minimizing the dropping of snow masses and generation of icicles. To this end, the floor of the narrow space D, that is, the ceiling of the interior A, of the building, is also provided with the same heat insulation material 18 as mentioned above to perfectly heat insulate the building interior A' from the outside.

With the narrow space D under the roof in communication with the outside of the building the snow accumulated on the roof d is frozen and fixed to the roof d of the building A and does not fall spontaneously even if the roof d is downwardly inclined from its center line. However, further snow accumulated in excess in case of a heavy snowfall will not be frozen but be liable to fall in masses. Thus, although it is possible to prevent spontaneous falling of snow in masses to a certain extent and also obtain room heating and hot water supply with the usual roof shape as mentioned, in order to ensure safety with respect to the falling of snow in masses in the instant embodiment the roof d has a downwardly inclined shape from its opposite edges. Also, a melted snow gutter 6 is provided along its center, which is lowest in level, and a warm air duct 7, to which warm air from the solar heat absorption systme B, is provided along the melted snow gutter 6, to heat the gutter 6 so as to cause snow accumulated in the neighborhood of the melted snow gutter 6 to be gradually melted and also cause snow on the roof d to be shifted inwards for melting it with warm air in the warm air duct. 7.

Water resulting from melting of snow is drained through the drain duct 8 into the ground without causing its freezing. In this way, the falling of accumulated snow in masses can be prevented. The solar heat absorption system B, which is provided on the sunny side a' of the building A and communicates with the warm air duct 7, comprises a heat collection frame 19 mounted on the sunny side a' of the building A in conformity to the shape thereof such that it communicates with the outlet and inlet ports 13 and 14 open to the sunny side a' of the building A and also with the warm air duct 7 provided along the roof d. The heat collection frame 19 is provided with a black corrugated or wavy solar heat absorption plate 21 mounted on the inner side of its inner wall, and warm water ducts 4 are provided in a zigzag form along the solar heat absorption plate 21 and are connected to the water storage tank 2 through a pump 22 and also to a hot water supply duct 5 provided in the interior A' of the building. The front side of the solar heat absorption system B constitutes a transparent plate 20, which defines together with the solar heat absorption plate 21 the heat collection path 23 communicating with the outlet and inlet ports 13 and 14. The outlet and inlet ports 13 and 14 can be opened and closed by respective hinged shutters 24 and a door 25 is mounted on top of the transparent plate 20.

With the above construction, in case of heating the interior A' of the building in the daytime in the winter season, the shutters 24 are opened, and air heated by the small room heater 1 is led through the ventilating ports 12, thus effecting the heating of the building interior A'. In addition, solar heat rays transmitted through the transparent plates 20 and absorbed by the solar heat absorption plates 21 are used to heat warm air passing through the heat collection path 23, and the resultant heated air at an elevated temperature is supplied to the interior A' of the building to aid the heating of the building interior A'. Thus, it is possible to maintain a desired air conditioning state with additional heating of air circulated through the interior A' of the building by natural convection and solar heat transmitted through windows 26. In case of weather without sunlight or at night, while supplying heat-retaining air remaining within the solar heat absorption system B, air heated by slight heat provided by the small room heater 1 is made full use of by leading it through the warm air guide path 10 and ventilating ports 12 for air conditioning of the building interior A'. In this way, a desired air conditioning state can be maintained with only a slight fuel cost. At the time of a weather requiring no air conditioning, that is, in a season free from air conditioning, the upper and lower shutters 24, 24 may be held closed. For circulating air through the interior A' of the building, the door 25 hinged to the heat collection frame 19 atop the transparent plate 20 is opened such that air within the solar heat absorption system B can be exhausted to the outside. Also, air in the interior A' of the building can be quickly exhausted to the outside for cleaning air in the building interior A' and also preventing a temperature rise therein.

As an example of the building, in which the total heat collection area of the solar heat absorption system B is 36 m$^2$ and the total window area is 30 m$^2$, that is, the total light receiving area is 36 m$^2$, assuming as low an incident solar heat energy in the winter season as 1,500 kcal/m$^2$ per day, the total incident energy is about 100,000 kcal per day, that is, 12,500 kcal per hour assuming the sunshine period to be 3 hours. This is comparable to heat energy from an air heater (a pot type kerosene stove) in the maximum combustion state thereof. This means that if there is fine weather throughout the daytime, no air heating by the stove is required. Rather excessive heat can be obtained, during the sunshine period, so that it is possible to obtain perfect saving of energy. Also, under the above conditions, water supplied to the interior A' of the building to the warm water ducts 4 in the solar heat absorption system B is elevated in temperature up to 45° C. even with a short sunshine period in winter and its temperature does not become lower than 25° C. even at night or at the time of cloudy weather so that it can be sufficiently utilized as hot water supplied to a bath tub 27, a sink 28 and so forth installed in the interior A' of the building.

The solar heat absorption system B is communicated adjacent its top portion with a warm air duct 7 provided along the roof d for melting snow accumulated on the roof d, with the resultant water led to the melted snow gutter 6 and drained through the drain duct 8 extending through the interior A' of the building or through the solar heat absorption system B so roof d in masses is avoided.

As an experimental building A, a solar heat absorption system B with a solar heat absorption plate area of 6.5 mm$^2$ was installed on a building A, which has its roof d and an area of 135 mm² downwardly inclined from opposite edges and is provided with the melted snow gutter 6 extending along the lowest level center line of the roof and also with the warm duct 7 communicating with the solar heat absorption system B according to the invention. With this building, snow accumulated on the roof d to a thickness of 15 cm and with a volume of 19.44 m³ was melted at a rate of 3.5 m³ per day with solar light irradiation of three hours per day. The sunshine period per day was assumed to be 3 hours with 3.8 hours being the average in the winter season in cold districts of Japan such as Hokkaido. This means that at least 117.0 m³ of snow was melted in about one month.

In addition, even when it is snowing there is no sunshine, at which time the external temperature is too low to melt snow, the temperature inside the solar heat adsorption system B and the warm air duct 7 does not become lower than 2° C. This is owing to transmitted subterranean heat and also to perfect heat insulation of the building interior A' from the outside, provided by the heat insulator 18 installed along the ceiling, that is, the bottom c of the space under the roof, all sides a and the bottom b of the building A. By virtue of this insulating material 18 and also snow drifted on the roof d and frozen to an extent not leading to spontaneous falling from the roof as masses, the temperature inside the heat insulated building interior A' does not become lower than 2° C. when the temperature of the external atmosphere becomes lower than 20° C. below zero. Thus, it is possible to melt snow drifted on the roof d and prevent an increase of the accumulated snow to such an extent that spontaneous falling of snow in masses from the roof onto the ground under the eves is likely. Further, even when it is snowing and cloudy, the temperature inside the solar heating absorption system, B is raised up to 20° C. in the daytime, and this has the effect of preventing dewing in the narrow space D under the roof.

As has been described in the foregoing, with the building according to the invention, which includes the small size room heater 1 and water storage tank 2 provided in the semi-basement C provided directly beneath the building A proper, has the interior of the building heat insulated from the external atmosphere with the heat insulator 18 installed along all sides a and bottom b of the building a and also the bottom c of the narrow space under the roof and is provided only on its sunny side wall a' with the solar heat absorption system B communication with the air circulation ports 13 open to the interior of the building A for heating the building interior and is also provided with the hot water ducts 4 connected to hot water ducts 4 connected to hot water supply ducts 5 installed inside the building A, it is possible to make full use of the solar heat as an auxiliary source of heat of room heating and completely dispense with the heat storage and hot water supply system. Also, the interior A' of the building can be heated throughout the daytime with natural air heating provided for the sunshine period, thus permitting reduction of the expenditure for room heating. Further, installation can be easily accomplished and requires low cost. Furthermore, an old house can be rebuilt as a coldproof energy-saving comfortable house of high heat efficiency, in which the individual rooms can be sufficiently and uniformly heated with a single simple room heater requiring little fuel cost, for instance a kerosene stove, and by making use of the solar heat as an auxiliary source of heat for room heating. In addition, with the roof d of the building A inclined downwards from the opposite ends and provided along the lowest level center with the melted snow gutter 6 and also with the provision of the warm air duct 7 extending along the melted snow gutter 6 and communicated with the solar heat absorption system B for melting snow drifted on the roof d and leading the melted snow water for draining to the melted snow gutter 6 and thence through the drain pipe 8 extending through the building interior A' or through the solar heat absorption system B, it is possible to adequately melt snow drifted on the roof d without causing freezing of it and lead the melted snow water for draining to the melted snow gutter 6 and thence through the drain duct 8 to the outside. This is achieved in that when the weather allows, the solar heat absorption plate 21 in the solar heat absorption system B is irradiated with solar light rays and absorbs and dissipates solar heat so as to elevate the temperature of air within the heat collection path 23 inside the transparent plates 20, with the air thus heated being supplied to the warm air duct 7 and also to the circulation path 3, and that warm air in the interior A' of the building and that flowing through the circulation path 3 is not cooled down since the warm air in the heat collection path 23 is withdrawn into the circulation path 3 and is then returned to the path by the action of the suction fan 29. That is, the warm air is always circulated through the heat collection path 23 of the solar heat absorption system B, warm air duct 7 and circulation path 13 extending through the building A, independently of whether it is daytime or night and also independently of the wheather, and also since the building A is heat insulated from the external atmosphere by the insulating material 18.

Although direct utilization of the solar heat cannot be made when it is cloudy or snowing, since the interior A' of the building is prefectly heat insulated from the outside by the heat insulator 18 installed on the bottom c of the space under the roof, all side walls a and bottom b of the building A, the air heated at the time of solar irradiation maintains its temperature while it is being circulated through the interior A' of the building such that the snow accumulated on the roof d is gradually melted and drained. More particularly, in case of a building other than the residential building such as a warehouse having no room heating equipment, since the interior is heated with warm air in the circulation path 3, accumulation of snow up to a state likely to cause spontaneous falling in masses, as in the prior art case, can be prevented.

Thus, when the invention is applied to a building other than the residential building such as warehouse, it is possible to eliminate the possibility of spontaneous falling of the accumulated snow in masses, that is, snow will not be accumulated in excess of a certain extent, and also at times other than that having sunshine, the stored solar heat and also the heat within the building can be made full use of to obtain the effect of natural melting of snow little by little, prevent the spontaneous falling of the accumulated snow and also prevent freezing of the water supply duct and water drain duct. Further, it is possible to extend the life of the building itself and reduce the expenditure for the removal of snow.

Figure 4:
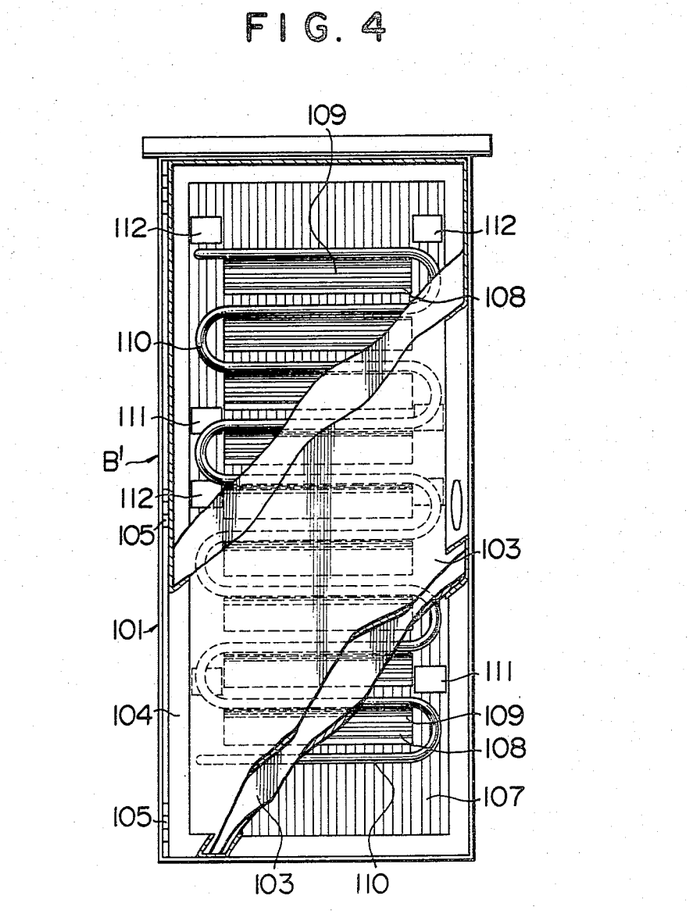
FIG. 4 is an elevational view, partly broken away, showing modifications of solar heat absorption system and water supply system.
Figure 5:
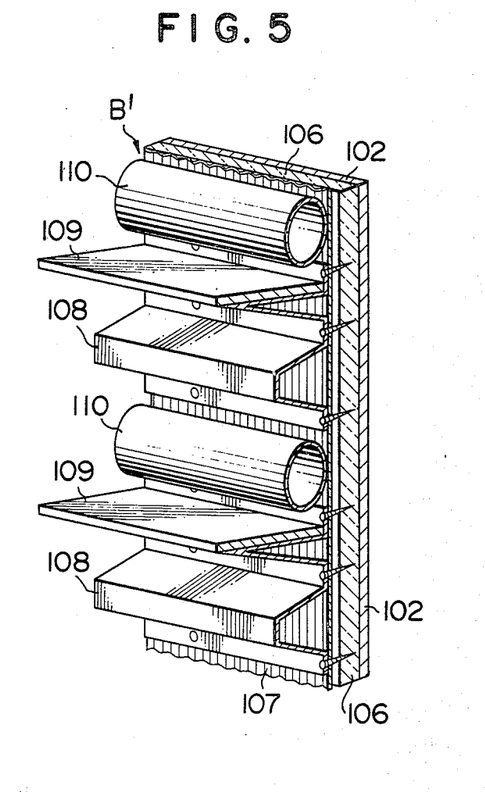
FIG. 5 is a fragmentary perspective view of the same.

FIGS. 4 and 5 show a modification of the solar heat absorption system B according to the invention. The illustrated solar heat absorption system B' comprises a box-like heat collection frame 101 made of material such as wood and aluminum and having a plywood board applied to its back side. Its open front side is sealed with a double-wall structure comprising two parallel transparent glass plates 103 fitted in a frame 104. The frame 104 is hinged by hinges 105 to the frame 101 so that it can be opened or closed to permit cleaning of the heat collection frame 101 and replacement of various parts mounted inside the frame 101 can be simply done.

Within the heat collection frame 101, a heat insulator 106 is applied to the surface of the back plate 102 and a corrugated or wavy solar heat absorption plate 107 having vertically extending hills and valleys is secured to the front surface of the heat insulator 16. The front side of the adsorption plate 107 is provided with vertically spaced parallel reflector plate support frames 108 each formed by bending a metal sheet having a high thermal conductivity into a desired shape and coating the front side with black heat-resistant paint. Glass reflectors 109 are secured to the top of the reflector plate support frame 108.

The glass reflector plate 109 comprises an ordinary transparent glass plate coated on one side with the heat-resistant paint and can efficiently absorb and reflect the solar heat. A hot water duct 110 is led into the heat collection frame 101 and extends in a meandering fashion between adjacent support frames 108.

In FIG. 4, designated at 111 is an inlet port and at 112 an outlet port.

Figure 6:
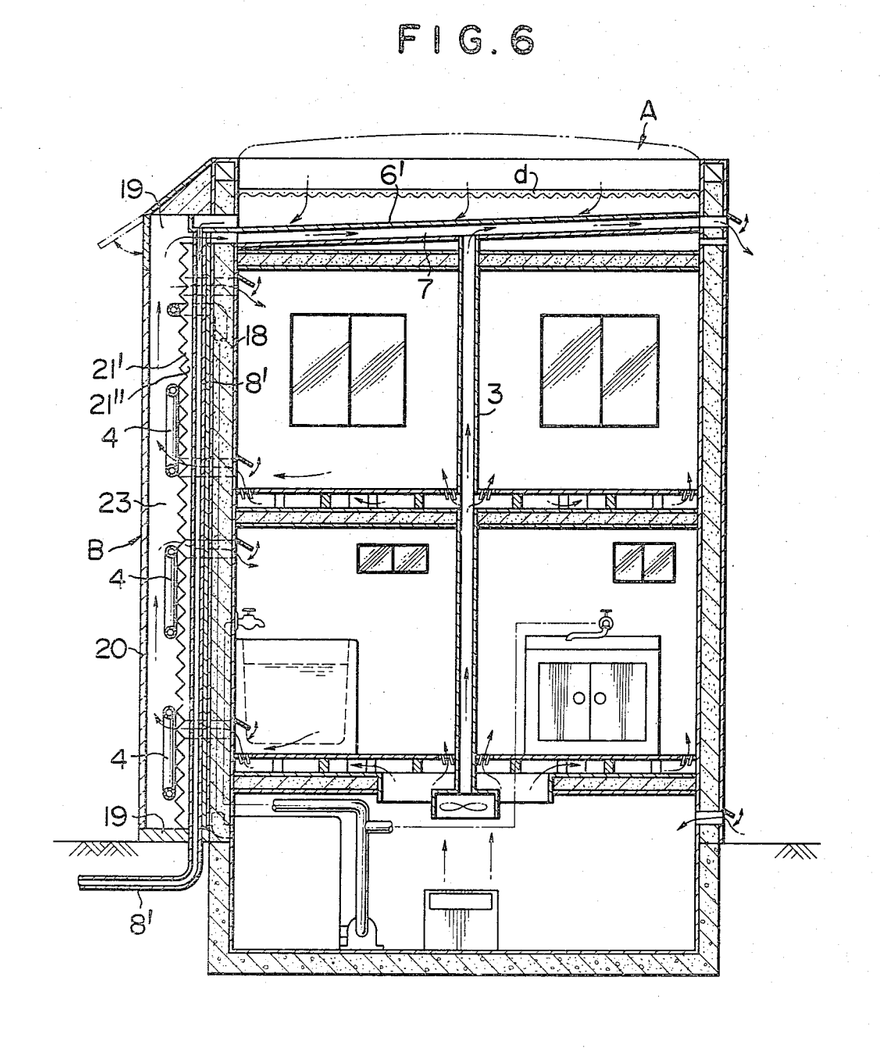
FIG. 6 is a view similar to FIG. 1 but showing a building incorporating a modification of the snow melting system.

FIG. 6 shows a modification of the snow melting system, more particularly a modification of the piping of the drain duct, in the embodiment of FIGS. 1 to 3. In the Figure, designated at 6' is a melted snow gutter which is downwardly inclined toward the solar heat absorption system B and its end is introduced into the heat collection frame 19. Designated at 8' is a drain duct 8, the upper end of which is connected to the aforementioned end of the melted snow gutter 6'.

The solar heat absorption plate 21' inside the heat collection frame 19 is provided with a substantially central, vertically extending channel-shaped gutter 21", within which the drain duct 81 is received. In this way, the drain duct 81 extends through the heat collection path 23, and its lower end penetrates the bottom of the heat collection frame 19 and projects to the outside. In FIG. 6, like parts as those in the embodiment of FIGS. 1 to 3 are designated by like reference numerals.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A building for cold districts, said building having a semi-basement and a roof comprising:
    a room heater unit provided within said semi-basement, heat insulation materials provided on outer side walls and bottom of said building and also a bottom portion of a narrow space under said roof of said building for heat insulating the interior of said building from external atmosphere;
    passage means each provided under a floor of each room of said building and communicating with said semi-basement such that warm air produced from said room heater unit is supplied through each of said passage means and to each room through the floor thereof, and
    a vertical solar heat absorption system having a heat collection path of a predetermined cross sectional area, and provided on a sunny side outer wall of said building, and at least two of the rooms of said building each having at least two vertically spaced ports communicating each said room with said solar heat absorption system; a warm air duct having a cross sectional area less than that of said heat collection path, and provided along the underside of said roof of said building and communicating with an upper end portion of said solar heat absorption system and a circulation path vertically extending from said warm air duct through the interior of said building into said semi-basement,
    whereby air in said rooms may be supplied to said solar heat absorption system via said ports, and whereby said air supplied via said ports is heated and expanded in said solar heat absorption system and may be returned to said rooms via said ports.

2. The building for cold districts according to claim 1, said solar heat absorption system comprising a heat collection frame installed on said sunny side outer wall of said building, a transparent plate mounted to close a front open side of said heat collection frame and a solar heat absorption plate mounted on a bottom portion of said heat collection frame, said solar heat absorption plate being black in color and having a wavy shape for readily absorbing solar heat, said heat collection frame also defining said heat collection path.

3. The building for cold districts according to claims 1 or 2, further comprising a pump, a water storage tank and a hot water duct provided within said solar heat absorption system and having one end thereof connected through said pump to said water storage tank, said hot water duct having an end connected to a hot water supply duct installed inside said building.

4. The building for cold districts according to claim 3, said water storage tank being disposed within said semi-basement.

5. The building for cold districts according to claim 3, wherein said hot water duct extends in an irregular fashion in front of said solar heat absorption plate, and further comprising parallel glass reflector plates each provided along and spaced apart from the underside of each horizontal portion of said hot water duct.

6. The building for cold districts according to claim 1, further comprising means for supplying warm air from said circulation path to each said passage under the floor of each of said rooms.

7. The building for cold districts according to claim 1, further comprising a suction fan disposed within said circulation path.

8. A building for cold districts, said building having a semi-basement and a roof comprising:
    a room heater unit provided within said semi-basement, heat insulation materials provided on outer side walls and bottom of said building and also a bottom portion of a narrow space under said roof of said building for heat insulating the interior of said building from external atmosphere;
    passage means each provided under a floor of each room of said building and communicating with said semi-basement such that warm air produced from said room heater unit is supplied through each of said passage means and to each room through the floor thereof, and a solar heat absorption system provided on a sunny side outer wall of said building, said warm air supplied to each of said rooms and/or air within each said room being introduced into said solar heat absorption system, heated therein by use of solar heat and returned to each of said rooms for heating said rooms, wherein said roof is downwardly inclined from opposite edges, and further comprising a melted snow gutter provided along a lowest level center portion of said roof and extending over said warm air duct and a drain duct communicating with said melted snow gutter, whereby snow accumulated on said roof is melted by warm air within said warm air duct and drained through said drain duct.

9. The building for cold districts according to claim 8, wherein said drain duct extends through said circulation path, through said semi-basement and extends therefrom outside of said building.

10. The building for cold districts according to claim 8, wherein said drain duct extends through said solar heat absorption system and extends therefore outside of said building.

* * * * *